United States Patent

[11] 3,565,094

[72] Inventors Giovanni Pisoni; Giovanni Ballestriero; Carlo Marucci, Milan, Italy
[21] Appl. No. 836,085
[22] Filed June 24, 1969
[45] Patented Feb. 23, 1971
[73] Assignee Kent-Tieghi SPA Milan, Italy
[32] Priority Jan. 15, 1965
[33] Italy
[31] 747,291
Continuation-in-part of application Ser. No. 517,775, Dec. 30, 1965, now abandoned.

[54] DIAPHRAGM-TYPE PNEUMATIC AMPLIFIER AND MODULATOR
9 Claims, 6 Drawing Figs.

[52] U.S. Cl. .......... 137/85; 137/596.18
[51] Int. Cl. .......... F15b 5/00, G05d 16/00
[50] Field of Search .......... 137/82, 85, 625.27, 625.66, 596.18

[56] References Cited

UNITED STATES PATENTS

| | | | |
|---|---|---|---|
| 1,887,322 | 11/1932 | Nettleton .......... | 137/82 |
| 3,042,072 | 7/1962 | Humphrey .......... | 137/625.27X |

*Primary Examiner*—Alan Cohan
*Attorney*—Wenderoth, Lind & Ponack

ABSTRACT: A pneumatic amplifier and modulator wherein a variable input signal results in an amplified and proportionally varied output. A fluid pressure is supplied in two spaced interconnected supply chambers having movable walls of different surface area and consisting of diaphragms having oppositely varying effective area and confining an externally vented space therebetween. A control chamber receives the input signal and has a third diaphragm wall connected to both said two fluid pressure oppositely urged diaphragms whereby the force exerted by a variable input pressure is balanced by the resultant force applied by supply pressure, said latter force varying as a function of stroke as said effective areas oppositely vary. Valve means are connected to said three diaphragms and designed to divide the supply output between an output signal outlet and a vent proportionally to the stroke.

INVENTORS
GIOVANNI PISONI
GIOVANNI BALLESTRIERO
CARLO MARUCCI
BY
Wenderoth, Lind & Ponack
ATTORNEYS INVENTORS
GIOVANNI PISONI
GIOVANNI BALLESTRIERO
BY CARLO MARUCCI
Wenderoth, Lind & Ponack
ATTORNEYS

DIAPHRAGM TYPE PNEUMATIC AMPLIFIER AND MODULATOR

CROSS-REFERENCE TO RELATED APPLICATIONS

This application is a continuation-in-part of our application Ser. No. 517,775, filed Dec. 30, 1965, now abandoned.

BACKGROUND OF THE INVENTION

This invention relates to a pneumatic amplifier and modulator device, wherein an input signal results in an amplified and modulated output signal and, more particularly, the invention is concerned with a device of simple and compact construction and very small overall dimensions, and which is capable of providing a greatly amplified and varied output signal, namely in terms of an output rate of pneumatic flow at an even relevant pressure, upon small variation of an input signal, namely a variable pressure, even greatly lower than the supply and output pressures.

In this disclosure and in the appended claims the expression "amplifier" is herein intended to mean a device which, upon a relatively small variation of the control (in this occurrence, the input pressure) provides a relatively large variation of outlet (in term of pressure or of rate of flow), the actual gain of the amplifier being represented by the ratio between the range of output variation and the range of input control variation, as more detailedly discussed below. In addition, the term "modulator" is herein intended to mean a device which is responsive to a modulated input or control signal, comprised within a given range, and which provides an output which is a function of said control signal, the device being capable of self-balance so that, within reasonable limits, at any given control pressure applied thereinto, a given output pressure or rate of flow is provided.

A great number of pneumatically controlled apparatuses and devices have been heretofore proposed and constructed. In general, such prior devices consist of pneumatic relays, pneumatically controlled valve devices and the like. In the most of occurrences, such prior devices are capable of on-off operation only, that is such devices comprise valve means which snap fully open or fully closed when the control pressure applied thereto actually reaches a value above or respectively below (or vice versa) a given reference pressure. A number of rather more complicated constructions provide a response to two different input pressures about the reference pressure for preventing flutter phenomena and reducing the pressure sensitivity of the device. Serious problem have been encountered when a somewhat modulating ability had been sought, in particular in small sized and simple mechanisms. Attempts have been made for variably biasing the stroke of a pressure sensitive component such as a piston or a diaphragm in view of proportionally control a valve or the like. Such attempts have not generally been successful in particular when very short strokes and/or low input control pressures were to be dealt with. A number of uncontrollable variables, such as frictional and inertial resistances, prejudice the regular and consistent operation of the device and undesirably limit its sensitivity.

SUMMARY OF THE INVENTION

The invention has for its principal object to provide a new and improved pneumatic amplifier and modulator which is not subject to the above and other objections and limitations, which are known to those skilled in the art to which this invention appertains.

More particularly, the invention has for its object to provide a relatively simple but quite sensitive and reliable amplifier and modulator of relevant amplification gain and capable of consistently modulate a fluid output in full accordance with a variation of control pressure.

According to an essential aspect of this invention, the new improved amplifier and modulator device comprises an input or control pressure actuated component which is effectively biased by a pneumatically supplied force provided by the same supply pressure and which is consistently and greatly varied as a function of the stroke of said movable component.

The above and other important objects of the invention are substantially attained by making use of and applying in a new and advantageous manner the known principle according to which a movable wall, to which a fluid pressure is applied and which consists of a flexible and essentially inextensible diaphragm, provides a force which is not given by the product of the pressure by its actual structural area, but by the product of pressure by a given "effective area," said latter area varying according to the stroke of the movable center portion of the diaphragm, that is the axial displacement of the center or "-plate" portion of the diaphragm relatively to the plane defined by its outer portion, clamped in the device's stationary case. The effective area is circumscribed by a circle the radius of which (which will be hereinafter termed "effective radius") is intermediate between the radius of diaphragm supporting center plate and that of the clamping section.

Such principle is known and it has been taken into account in the field of "diaphragm motors" An analysis of the behavior of such diaphragms, which is quite different from that of piston-type reciprocating mechanisms, can be for example found on pages 7—30 and 7—31 of "Handbook of Instrumentation and Controls,"] McGraw-Hill, 1961, wherein an explanation of the phenomena and of the effects of diaphragm thrust as a function of the stroke can be read. We have found and herein suggest that the effective radius of a diaphragm, having its unsupported annular portion sagging under a fluid pressure, can be assumed to be radius of the circle at which the sagged portion is tangent to a plane parallel to plane on which the supported portions (either plate and clamped) of the diaphragm lie. Such assumption, which has experimentally been proved as trustworthy, will be discussed below.

Now, according to the invention, we have provided a new and improved modulator device wherein a control pressure urged first diaphragm is connected to an oppositely supply pressure urged second diaphragm and to output controlling valve means arranged for providing a greater output as said first diaphragm is stroked upon an increased control pressure. The said first and second diaphragms are arranged in a control and—respectively in a supply chamber so that the effective radius of first control diaphragm decreases and that of the second supply pressure urged diaphragm increases as a function of the stroke. In this occurrence, it is specified that the term "stroke" is herein intended to mean the motion of the movable components in the direction resulting from an increased control pressure, while the opposite movement will be termed "return stroke" as this description proceeds.

Further, according to another feature of the invention, we have provided a new and improved amplifier device in which a third supply pressure urged diaphragm is provided. Such third diaphragm is connected to both said first and second diaphragms and to said valve means, it is arranged in the device for being urged by supply pressure in the stroke direction, and has its effective radius lesser than that of said second supply pressure urged diaphragm. Therefore, the supply pressure exerts upon the third diaphragm a force concurrent with the one exerted by the control pressure upon the first control diaphragm, said force being however lesser than the force exerted by the same supply pressure upon the second diaphragm; which has a greater effective radius. As a consequence of what above, the supply pressure actuated system, consisting of the oppositely urged second and third diaphragms, will exert a resultant force defined by the difference between the above forces, said resultant force being proportional to the difference between the second powers of the effective radii of said second and third diaphragms.

Still further, as an other consequence of the above arrangement, the effective radius of the third diaphragm decreases with the stroke while that of the second and greater diaphragm increases with said stroke. Therefore, the difference between the forces actually applied by the supply pressure to said second and third diaphragms sharply increases as a function of the stroke, providing a correspondingly sharply increasing resultant force biasing the control force provided by the control pressure applied to the first diaphragm. Said supply pressure actuated system therefore provides a real and highly effective pneumatic bias which is very sensitive to even small stroke increments and ensures a reliable balance to even little varying control pressure, the balance being verified at a plurality of positions of the movable assembly, thus providing the most desirable modulation, while by providing a relatively small difference between the effective radii of second and third diaphragms (that is a small resultant biasing force) the most desirable amplification is also provided.

These and other features and advantages of the invention will be at best understood from the following detailed description of a preferred embodiment thereof, illustrated and explained in and by the accompanying drawings, forming an essential component of this disclosure.

DETAILED DESCRIPTION OF THE PREFERRED EMBODIMENT

Figure 1:
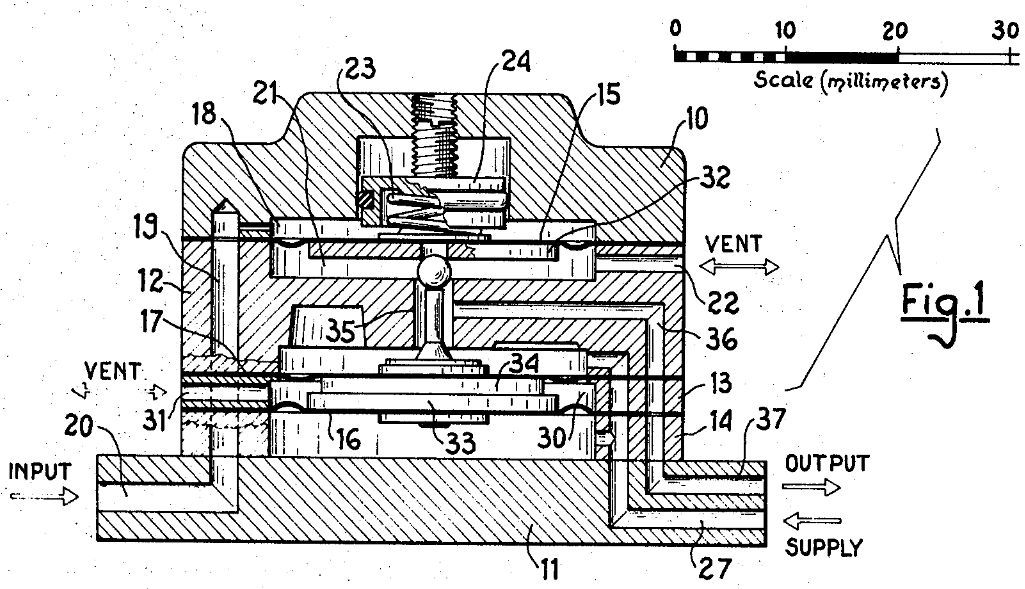
FIG. 1 is a sectional view of a preferred embodiment of the invention, and has a comparison scale added for the best understanding of the small overall dimensions in which the device can actually be manufactured.
Figure 2:
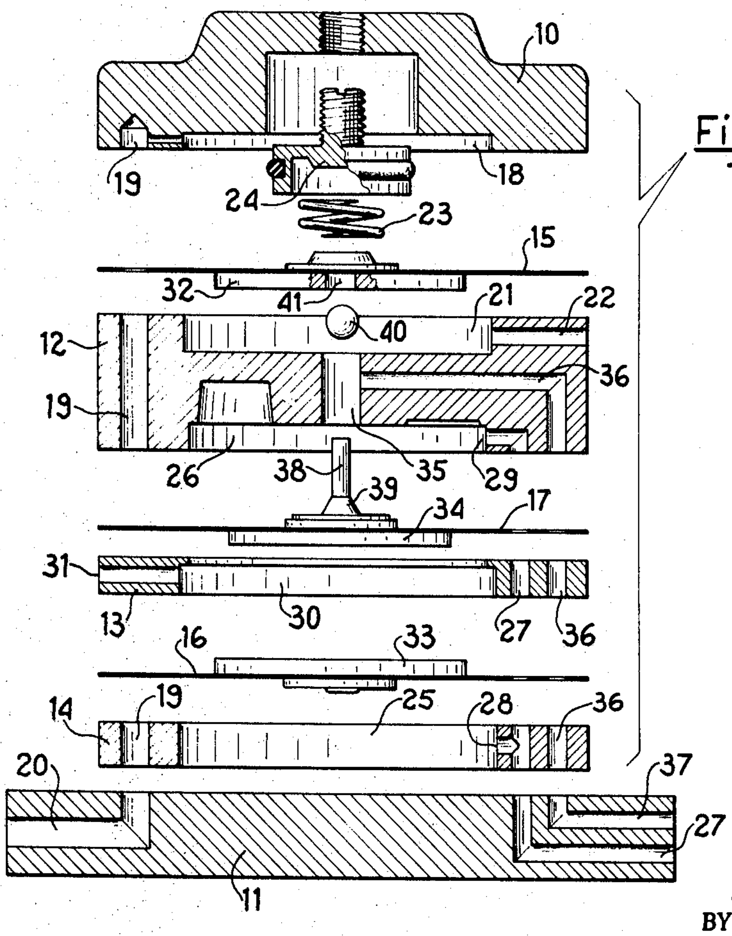
FIG. 2 is a exploded view of the device of FIG. 1.
Figure 3:
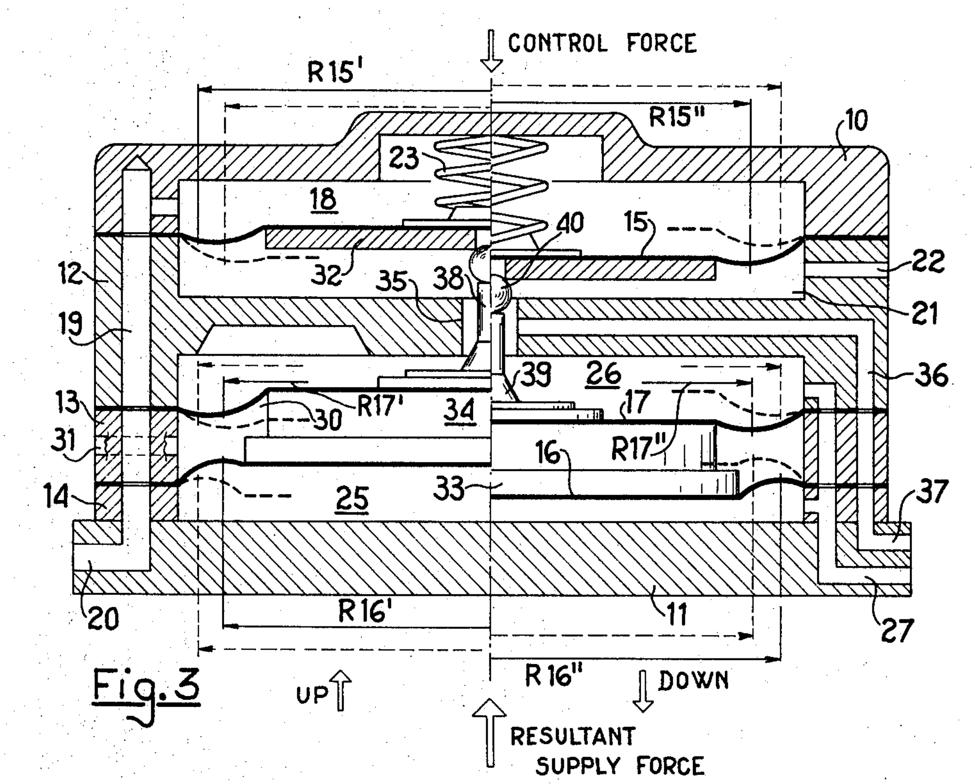
FIG. 3 diagrammatically illustrates the device of FIG. 1, with voluntarily exaggerated dimensional alterations and shows the device in two different stroke positions in its left and respectively right halves.

Referring now to the drawings, wherein like reference numerals and letters refer to like parts, elements, motions and directions throughout the several FIGS.:

In FIGS. 1 and 2 there is shown a pneumatic amplifier and modulator comprising a stationary device body which in the preferred embodiment consists of a plurality of superimposed components such as a cover plate 10, a bottom plate 11 and annular parts 12 to 14 interposed therebetween. It is herein intended that the terms "above" and "below," and likewise the terms "up" and "down" as readable hereinafter and labeled in FIG. 3, are given for convenience only and with relation with the showing, the device being operable irrespectively of its actual position in the space. A first diaphragm 15 is clamped at its outer portion between components 10 and 12 and a second and a third diaphragms 16 and 17 are likewise clamped between components 13 and 14 and respectively components 12 and 13. The said components are firmly secured together by suitable means, such as screws, bolts or the like. Such means are not shown as being conventional in the art.

Figure 2A:
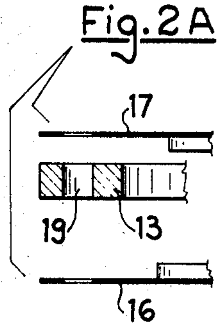
FIG. 2A is a similar exploded view of a part of the components and shows a detail broken away in FIGS. 1 and 2.

Above the first diaphragm 15 a control chamber 18 is formed in the cover 10. Such chamber can be connected to a source of control pressure (input) through ducts such as 19 and 20 bored through said components (see FIG. 2A also). A space 21 is formed in components 12 below said first diaphragm 15 for free operation of said diaphragm, said space 21 being vented to atmosphere at 22. Above said first diaphragm a spring 23 can be provided, said spring abutting on a screwly adjustable component 24. Such spring serves for adjustable component 24. Such spring serves for adjustment purposes and for having a better linear response. As far the typical features and operation of the device are concerned with, such spring and its adjustment can be disregarded and will not further be discussed.

The said second diaphragm 16 forms the upper and movable wall for a first supply chamber 25 formed in the component 14 and the third diaphragm 17 forms the lower and movable wall for a second supply chamber 26 formed at the lower face of component 12. Both said chambers are designed for communication with a source of pressurized fluid (supply) through a common supply passage 27 leading to two inlets 28 and 29 in said chambers 25 and respectively 26. A space 30 is formed in component 13 between said second and third diaphragm 16 and 17, said latter space being vented to atmosphere at 31.

All said diaphragms are conventionally clamped thereabout in the stationary casing of the device, have their center portions supported by center plates and annular unsupported portions between their clamped and plate supported sections, the respective plates being located adjacent to the diaphragms at the face thereof opposite to that upon which the fluid pressure is applied. Thus, the first diaphragm 15 has a plate 32 therebelow, second diaphragm has a plate 33 thereabove, and third diaphragm 17 has a plate 34 therebelow, the plates 33 and 34 being integrally formed or fixedly secured to each other so that the center portions of such second and first diaphragms are caused to concurrently and jointly move.

The outer and plate diameters of third diaphragm 17, that is the diameters of its clamped portion and respectively of its plate 34, are lesser than the correspondingly outer and plate diameters of second diaphragm 16. Therefore, the second diaphragm 16 has either structural and effective areas greater than those of third diaphragm 17.

The component 12, interposed between the first and third diaphragms 15 and 17, respectively, has a central bore 35 connected, at an its intermediate point, to a duct 36, 37 through which the output signal is delivered and which, therefore, is to be connected to the device or apparatus (not shown) designed to be serviced by the amplifier and modulator device of the invention. The movable subassembly comprising said second and third diaphragms 16 and 17 and their plates 33 and 34 is integrally formed with or fixedly secured to a pin 38 (this and the following elements being seen at best in FIGS. 2 and 3) axially located at clearance within said bore 35 and conically shaped at 39 in its lower portion or root. Such tapered portion 39 is designed for acting as a valve member with respect to the lower end or outlet of said bore 35, which forms a valve seat therefor. The upper end face of same pin 38 abuts from below on an upper valve member forming ball 40, which has for its valve seat the upper end or outlet of same bore 35. Such ball 40, at its turn, abuts from below on the center of plate 32 of the first diaphragm 15, said plate being provided with a center bore or recess 41 for maintaining said ball 40 centered into axial alignment with the bore 35 therebelow.

The construction of said valve means could obviously be modified, without departing from the scope of the invention, namely as defined in the appended claims. For example, the valve members might be either made of tapered portions, provided that a progressively passage area which varies as a function of stroke can be suitably provided.

By taking into consideration the showing of FIG. 3 also, the operation of the above described device can be readily understood. Assuming that a signal pressure is applied to input at 20, such pressure when applied in control chamber 18 will exert a downwardly directed force upon first diaphragm 15 and on ball 40, pin 38 and both supply controlled diaphragms 16 and 17. Such force is indicated on FIG. 3 by an arrow labeled "Control Force," and its value is a function of the control pressure applied at 20 and of the second power of actual effective radius of first diaphragm 15, which varies as discussed below.

Assuming now that a supply pressure is applied at 27 and therefore in either supply chambers 25 and 26, such pressure will exert an upwardly directed force on second diaphragm 16 and a downwardly directed force on third diaphragm 17. Therefore on the said movable subassembly the supply pressure will exert a resultant force which is proportional to the difference between the actual effective areas of said diaphragms 16 and 17. The area of the upwardly urged diaphragm 16 being greater, the resultant supply force will be upwardly directed, as indicated by a correspondingly labeled arrow in FIG. 3.

From what above it will be evident to those skilled in the art that the described device can act and acts as a real and efficient amplifier. An even small control input pressure can provide a control force which can balance an equal and opposite resultant supply force provided by a very many times greater supply force. As a matter of fact, the resultant force is provided by the supply pressure applied upon second diaphragm 16 minus the oppositely directed force applied by same supply pressure upon the third diaphragm 17. By providing a second and a third diaphragm of slightly different effective areas, a resultant supply force which can be many times lesser than the force actually applied upon either individual second and third diaphragms can be provided.

The effects of the described valve means can be also best understood from a consideration of FIG. 3. The actual stroke of the movable subassembly is structurally confined between an uppermost position (left-hand part of FIG. 3) wherein the cone 39 abuts on the lower end of bore 35, and a lowermost position wherein the ball 40 abuts from above on the upper end of same bore 35. In the former occurrence, no output signal exists, because the output at 37 communicates with the atmosphere via the duct 36, bore 35, space 21 and vent 22, and the communication between any supply pressurized chamber, namely the chamber 26, and the bore 35, is closed by plugging of cone 39 in the lower end of said bore. In the latter occurrence, the bore 35 does not communicate with the atmosphere, as being plugged by ball 40 at its upper end, while it communicates with the supply pressurized chamber 26 at its lower end. The supply pressure applied at 27, therefore, will be applied in its entirety at output 37, via ducts 27 and 29, chamber 26, bore 35 and duct 36. A supply flow at the maximum available rate (taking into account the resistance encountered by the fluid along such ducts and passage means) will be delivered at output 27.

Assuming now that said subassembly will be set at a position intermediate between said uppermost and lowermost positions, a minor rate of flow will be available in bore 35, as a consequence of partial penetration of cone 39 in the lower end thereof. Such available rate of flow will be parted between the output 37, via passage 36, and the vent 22, via the partially open upper end of bore 35 and the vented chamber 21. It is to take into consideration that as the downward stroke progresses, the ball 40 will choke the upper end of bore 35 and the cone 39 will open the lower end of same bore 35 for delivering pressurized fluid therethrough. In other words, when a lesser rate of fluid is flowing within bore 35, the upward return stroke progresses, and a greater part of the flowing fluid will be admitted to be discharged in the atmosphere. Therefore, upon upward and downward stroking of the said movable subassembly, the output signal will be modulated, that is controlledly varied.

Figure 4:
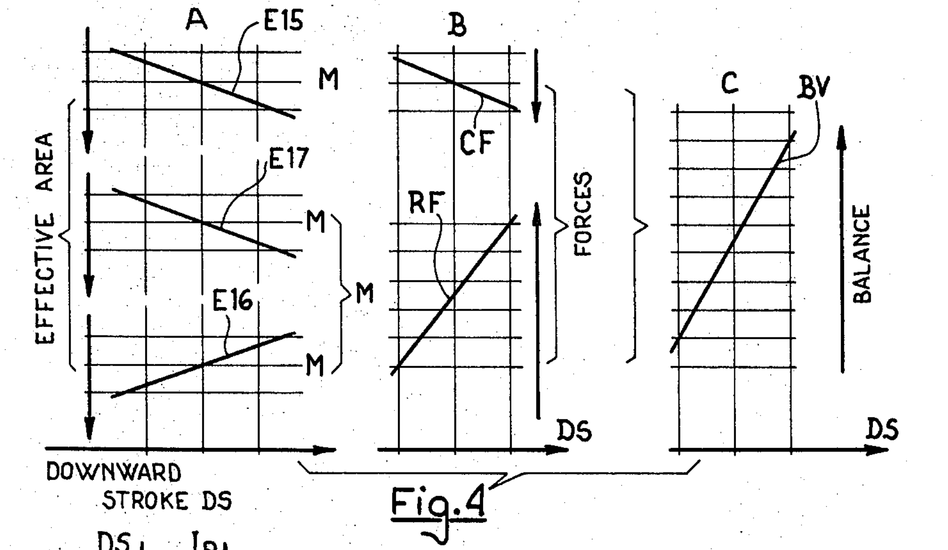
FIG. 4 is a graph wherein the principal effects and results of the features of the invention are visualized.

The control is provided by varying the control pressure at input 20 and therefore in control chamber 18, to provide a correspondingly varied control force. Such force is biased by the resultant supply force which greatly varies as a function of the stroke. The sensitivity of the device is further improved by a substantial variation of the control force as a function of the stroke, too. These features will be also understood upon a consideration of FIG. 3; together with the graphs A, B and C of FIG. 4.

In FIG. 3 the effective radii of the diaphragms are indicated by capital letter R followed by a numeral indicative of the individual diaphragm. The index (′) indicates the effective radius at the uppermost position about and the index (″) indicates the effective radius at lowermost position of the respective diaphragm plate portion. From a comparison between the left and right parts of FIG. 3, there is seen that the radius R15′ of the first diaphragm decreases to R15″ during the downward stroke. Therefore, the effective area of first diaphragm 15 decreases during the stroke in accordance with the second power of effective radius R15. For a given constant input pressure at 20, the control force (CF) will correspondingly decrease.

The third diaphragm 17 is urged by the supply pressure in the same direction at which the control pressure acts on said first diaphragm 15. Therefore, the effective radius of the third diaphragm decreases from R17′ down to R17″ during downward stroke, while the effective radius of the oppositely operating second diaphragm 16 increases from R16′ to R16″. The negative variation of effective areas of first and third diaphragms 15 and 17 and the positive variation of that of second diaphragm 16 are visualized in graph of FIG. 4A by downwardly and respectively upwardly slanting segments E15 and E17 and, respectively, E16. For a given control pressure, the control force will vary concurrently with the effective variation of effective area of first diaphragm 15, as visualized by downwardly slanting segment CF in graph of FIG. 4B. The resultant supply force (RF), on the contrary, for a given supply pressure, will sharply increase such as visualized at RF in FIG. 4B also, because such force is the resultant of an increasing upwardly acting force (the supply pressure applied upon diaphragm 16 of increasing effective radius and area) minus a decreasing downwardly acting force (same supply pressure applied upon diaphragm 17 of the decreasing effective radius and area).

The combination and the arrangements of the described two supply pressure oppositely urged diaphragms 16 and 17 and their structural and effective dimensional relationship provide an exceptionally effective "pneumatic spring" bias having a sharp increment with the stroke. Such sharp increment is visualized by steepingly slanting segment RF in FIG. 4B. The algebraic sum decreasing control force (CF, in FIG. 4B, for a given pressure) and of steepingly increasing resultant force, RF in FIG. 4B is visualized by the very upwardly slanting segment BV of FIG. 4C, which is representative of the balance variation, that is the variation, as a function downward stroke (DS), of the control and resultant supply forces at the various positions of the movable subassembly during the downward stroke. Now, assuming that the supply pressure is constant, a variation of the input signal, that is the pressure applied at 20 and within chamber 18, will promote a displacement of the above discussed subassembly until a new position in which the control force will be balanced by the resultant supply force is reached. Said resultant supply force so steepingly varies that the described device is capable of effectively and reliably modulate by performing exceptionally short strokes.

Figure 5:
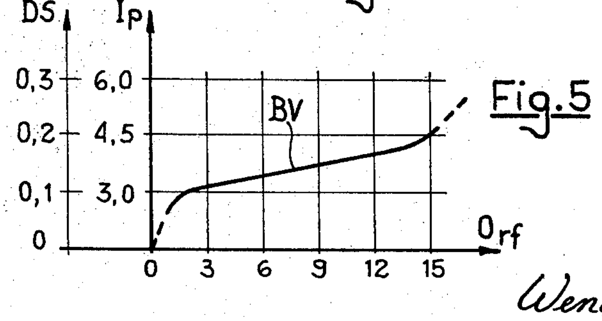
FIG. 5 is a graph illustrating the amplification and modulation ability of a device constructed according to the invention in its actual working span.

The reliableness of a pneumatic amplifier and modulator constructed essentially as shown in FIGS. 1 and 2 (wherein the valve means forming parts have been illustrated in slightly enlarged scale, for better showing thereof) will be apparent upon a brief consideration of the graph of FIG. 5. Such graph indicates the curve BV of actual balance variation plotted from a device as above. The curve indicates the stroke (DS) in millimeters, and the input pressure (Ip) in p.s.i., as a function of the output rate of flow (Orf). The actual operative working span is comprised within 0.1 and 0.2 millimeter of stroke, provided by an input control pressure varying from 3.0 to 4.5 p.s.i. Such control variation provides a variation of rate of flow 1.5 to 15 cu. ft/min. about, at 10 p.s.i. about, with a nearly linear response through the entire working span. Spring 23 cooperates therefor.

The device is exceedingly simple and compact, in relation with its abilities and it can be constructed in very small overall dimensions, such as made apparent from the comparison scale (in millimeters) shown in FIG. 1. Its sturdy construction ensures a long work life and no substantial maintenance and adjustment operations are required. The device is adapted for a wide range of uses in the well worked out art of pneumatically operated and controlled apparatuses and plants.

We claim:

1. A pneumatic amplifier and modulator comprising a control chamber having a first control movable wall, and inlet control passage for transmitting a control pressure signal in said control chamber to exert a control force on said movable wall in a given stroke direction, a supply chamber having a second movable wall consisting of diaphragm having a variable effective area, a supply passage for supplying pressurized fluid to said second chamber to exert a supply force in direction opposite to said stroke direction, said movable walls being interconnected for concurrent movement thereof, valve means connected with said movable walls and comprising an input connected to said supply passage and two outlets connected to an output signal outlet and respectively to a vent to atmosphere for variably parting said pressurized fluid between said two outlets at a ratio proportional to said stroke, said movable walls and valve means being arranged so that as said walls and means are displaced by an increasing control pressure, the effective area of said second wall increases for increasingly biasing said control force and respectively said means part a greater amount of pressurized fluid to said output.

2. The device as set forth in claim 1, wherein said first movable wall consists of a first diaphragm having an effective area which decreases as a function of the stroke in said direction.

3. The device as set forth in claim 1, further comprising a second supply chamber connected to said supply passage and having a third movable wall connected to said first and second movable walls and valve means and consisting of a third diaphragm having an effective area smaller than the effective area of said second diaphragm, said third chamber being positioned for causing said pressurized fluid to exert on said third diaphragm a force in said stroke direction, whereby said control force is variably biased by a resultant supply force given by the difference of the forces exerted by said supply pressure on said second and third diaphragm, said resultant biasing force increasing during a stroke in said direction as a combined function of increasing of the effective area of said second diaphragm and of decreasing of the effective area of said third diaphragm.

4. The device as set forth in claim 3, wherein the said second and third diaphragms are coaxially and spacedly located and confine therebetween a space vented to atmosphere.

5. The device as set forth in claim 1, wherein said valve means comprise a bore having two oppositely located valve seat forming ends and connected at an its intermediate point to said output signal outlet, a rod-like member coaxially located within and longitudinally movable along said bore in response of the stroke movement of said movable walls, one of said bore end being connected to a supply chamber supplied with said pressurized supply fluid and the other of said ends being vented to atmosphere, a first and a second valve member drivedly connected to said rod-like member and positioned for oppositely progressively opening said one and respectively said other valve seat forming bore end as said movable walls are caused to move in said given stroke direction and respectively in opposite direction upon applying of an increasing and respectively decreasing control pressure.

6. The device as set forth in claim 5, wherein the said first movable wall has a vented chamber formed adjacently to its face opposite to that facing said control chamber, said vented chamber being vented to atmosphere and said other bore end opens in said vented chamber.

7. The device as set forth in claim 3, wherein the said first movable ball consists of a first diaphragm having an effective area decreasing as a function of the stroke in said given direction to supply a control force proportionally decreasing with said stroke against a biasing supply resultant force steepingly increasing with same stroke in said direction.

8. The device as set forth in claim 3, wherein the said second and third diaphragms have each an outer clamped portion, an inner plate supported portion and an unsupported annular portion therebetween, the diameters of said clamped and supported portion of second diaphragm being greater than the corresponding diameters of said third diaphragm.

9. The device as set forth in claim 8, wherein the inner plates supporting the center portions of said second and third diaphragms are located in a space vented to atmosphere and formed between said diaphragms, and wherein said unsupported portions of same diaphragms sag in opposition towards said space.